US009990726B2

(12) United States Patent
Langer et al.

(10) Patent No.: US 9,990,726 B2
(45) Date of Patent: Jun. 5, 2018

(54) METHOD OF DETERMINING A POSITION AND ORIENTATION OF A DEVICE ASSOCIATED WITH A CAPTURING DEVICE FOR CAPTURING AT LEAST ONE IMAGE

(71) Applicant: Apple Inc., Cupertino, CA (US)

(72) Inventors: Marion Langer, Munich (DE); Peter Meier, Munich (DE); Selim BenHimane, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 369 days.

(21) Appl. No.: 14/430,170

(22) PCT Filed: Sep. 27, 2012

(86) PCT No.: PCT/EP2012/069075
§ 371 (c)(1),
(2) Date: Mar. 20, 2015

(87) PCT Pub. No.: WO2014/048475
PCT Pub. Date: Apr. 3, 2014

(65) Prior Publication Data
US 2015/0235367 A1 Aug. 20, 2015

(51) Int. Cl.
*G06T 7/70* (2017.01)
*G06T 7/80* (2017.01)
(Continued)

(52) U.S. Cl.
CPC ............ *G06T 7/0042* (2013.01); *G06K 9/52* (2013.01); *G06K 9/6201* (2013.01); *G06T 7/70* (2017.01);
(Continued)

(58) Field of Classification Search
None
See application file for complete search history.

(56) References Cited

U.S. PATENT DOCUMENTS 5,647,015 A 7/1997 Choate et al.
5,792,610 A 8/1998 Witney
(Continued)

FOREIGN PATENT DOCUMENTS

CN 102435172 A 5/2012
GB 2315124 A 1/1998
(Continued)

OTHER PUBLICATIONS

C. Steger. Occlusion, clutter, and illumination invariant object recognition. International Archives of Photogrammetry and Remote Sensing, vol. XXXIV, 2002.
(Continued)

*Primary Examiner* — William C Vaughn, Jr.
*Assistant Examiner* — Lindsay Uhl
(74) *Attorney, Agent, or Firm* — Blank Rome LLP

(57) ABSTRACT

A method of determining a position and orientation of a device is provided. The position and orientation of the device is determined based on multiple degrees of freedom (DoF) and the device is associated with a capturing device for capturing at least one image is provided. The method includes: capturing at least one image of a real object with the capturing device, and providing a coordinate system in relation to the object; providing an estimation of intrinsic parameters of the capturing device; providing pose data to compute first and second DoFs in the coordinate system, with each DoF having a confidence degree; determining an initial pose of the device; performing a pose estimation process, and calculating in the pose estimation process an estimation of the DoFs having a second confidence degree; and determining a position and orientation of the device.

25 Claims, 12 Drawing Sheets

(51) Int. Cl.
  *G06T 7/00* (2017.01)
  *H04N 7/18* (2006.01)
  *G06K 9/62* (2006.01)
  *H04N 5/232* (2006.01)
  *G06K 9/52* (2006.01)

(52) U.S. Cl.
  CPC ........... *G06T 7/80* (2017.01); *H04N 5/23293* (2013.01); *H04N 7/18* (2013.01)

(56) References Cited

U.S. PATENT DOCUMENTS

| | | | |
|---|---|---|---|
| 5,850,469 | A | 12/1998 | Martin et al. |
| 6,763,129 | B1 | 7/2004 | Honda |
| 7,233,691 | B2 | 6/2007 | Setterholm |
| 7,583,858 | B2 | 9/2009 | Gallagher |
| 9,008,462 | B2 | 4/2015 | Akhbardeh |
| 9,443,355 | B2 | 9/2016 | Chan |
| 9,542,732 | B2 | 1/2017 | Bogan |
| 9,607,236 | B1 | 3/2017 | Wilbert |
| 2003/0026385 | A1 | 2/2003 | Dinten |
| 2005/0008256 | A1* | 1/2005 | Uchiyama ................ G06T 7/80 382/291 |
| 2006/0071945 | A1 | 4/2006 | Anabuki |
| 2006/0078215 | A1 | 4/2006 | Gallagher |
| 2007/0092161 | A1* | 4/2007 | Aratani .................... G06T 7/73 382/286 |
| 2009/0110267 | A1* | 4/2009 | Zakhor .................. G06T 15/04 382/154 |
| 2010/0119139 | A1 | 5/2010 | Bertram |
| 2011/0164165 | A1 | 7/2011 | Hashimoto |
| 2013/0057714 | A1 | 3/2013 | Ishii |
| 2013/0322723 | A1 | 12/2013 | Akhbardeh |
| 2014/0037136 | A1 | 2/2014 | Ramalingam |
| 2015/0235367 | A1 | 8/2015 | Langer |

FOREIGN PATENT DOCUMENTS

| | | |
|---|---|---|
| JP | 2001111835 A | 4/2001 |
| JP | 2006516908 A | 7/2006 |
| JP | 2007043545 A | 2/2007 |
| JP | 2007524950 A | 8/2007 |
| JP | 2012038318 A | 2/2012 |
| WO | 2012112929 A2 | 8/2012 |

OTHER PUBLICATIONS

Comport et al.. Real-Time Markerless Tracking for Augmented reality: The Virtual Visual Servoing Framework. Transactions on Visualization and Computer Graphics, 2006.

Karlekar et al. Positioning, Tracking and Mapping for Outdoor Augmentation, International Symposium on Augmented and Mixed Reality, 2010.

Klein et al. Improving the Agility of Keyframe-Based SLAM. European Conference on Computer Vision, 2008.

Kurz et al. Inertial sensor-aligned visual feature descriptors. Computer Vision and Pattern Recognition, 2011.

Reitmayr et al. Going out: Robust Model-based Tracking for Outdoor Augmented Reality, International Symposium on Augmented and Mixed Reality, 2006.

T. Drummond, R. Cipolla. Real-time tracking of complex structures with on-line camera calibration. British Machine Vision Conference, 1999.

Tamaazousti et al. Real-Time Accurate Localization in a Partially Known Environment: Application to Augmented Reality on textureless 3D Objects. TrakMark, 2011.

Vacchetti et al. Combining edge and texture information for real-time accurate 3D camera tracking. International Symposium on Augmented and Mixed Reality, 2004.

Wiedemann et al. Recognition and Tracking of 3D Objects. Deutsche Arbeitsgemeinschaft für Mustererkennung, 2008.

Wuest et al. Tracking of industrial objects by using CAD models, Journal of Virtual Reality and Broadcasting, vol. 4, 2007.

Holzer et al., "Distance Transform Templates for Object Detection and Pose Estimation," IEEE Computer Society Conference on Computer Vision and Pattern Recognition, 2009.

Klein et al., "Full-3D Edge Tracking with a Particle Filter," Proc. British Machine Vision Conference, 2006.

Satoh et al. "A Hybrid Registration Method for Outdoor Wearable Mixed Reality," vol. 7, No. 2, pp. 129-138, 2002.

* cited by examiner

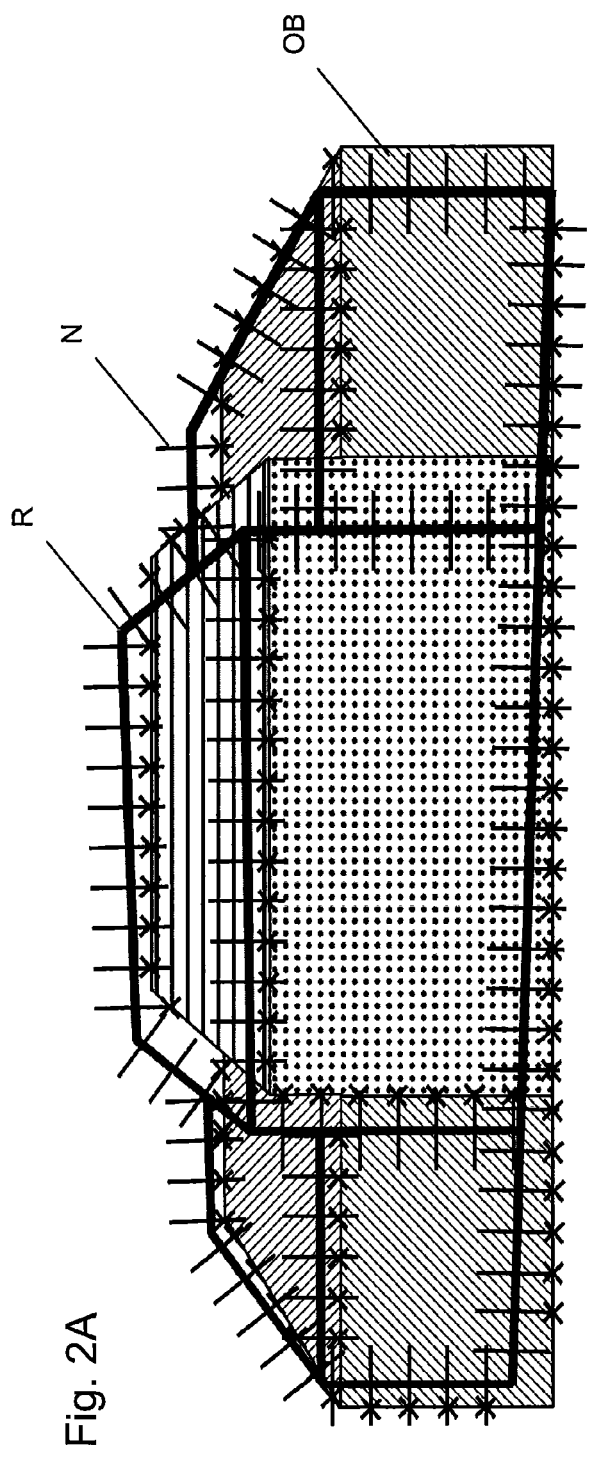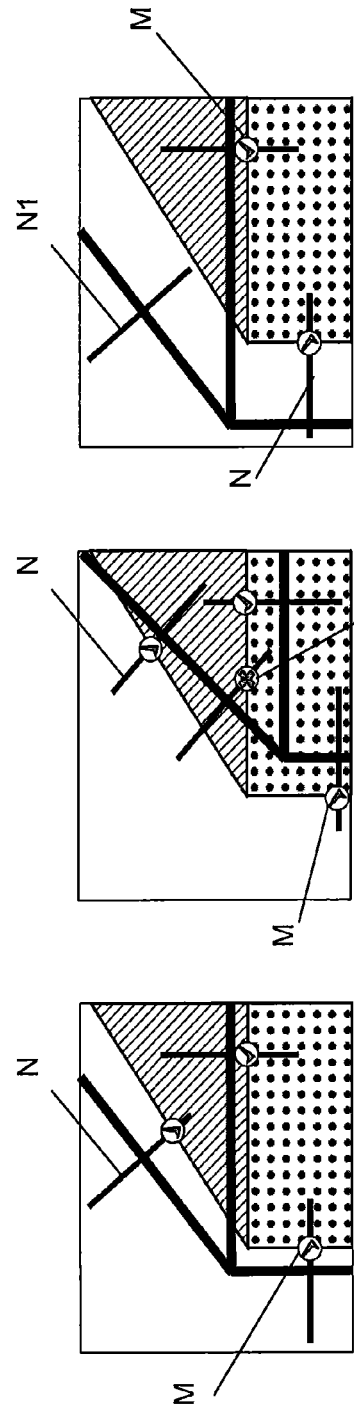

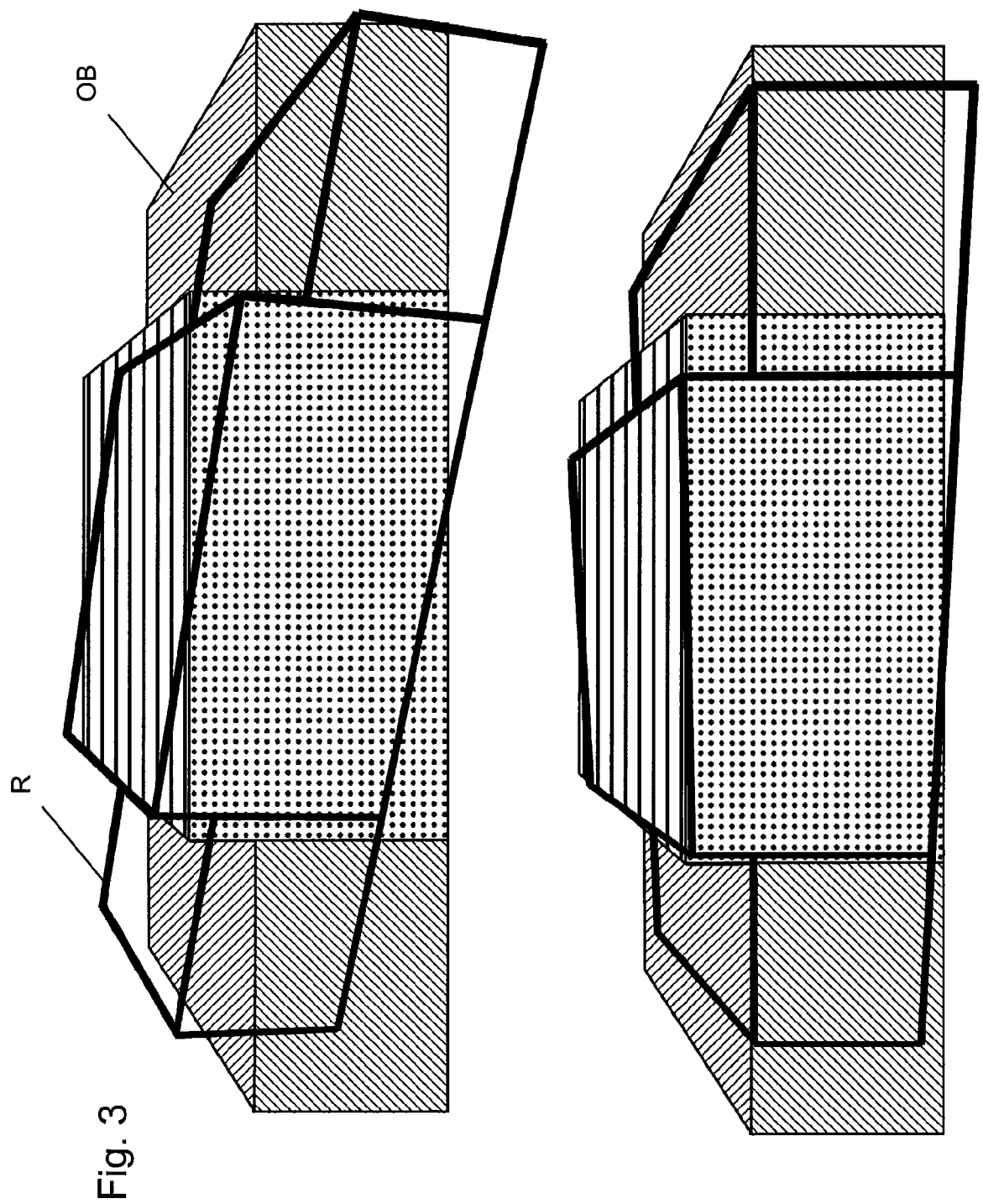

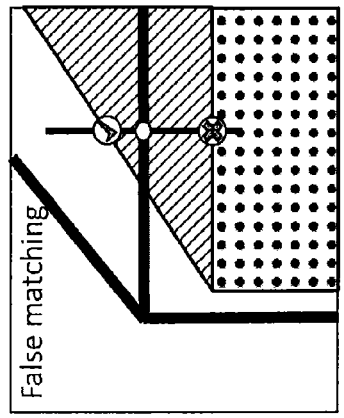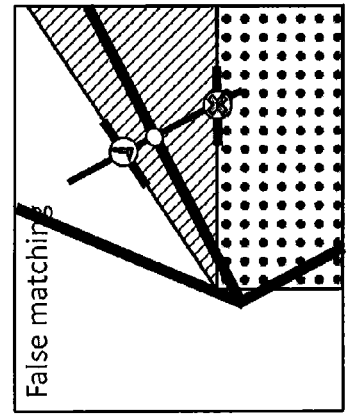
Fig. 5A　　　　　　　　　　Fig. 5B
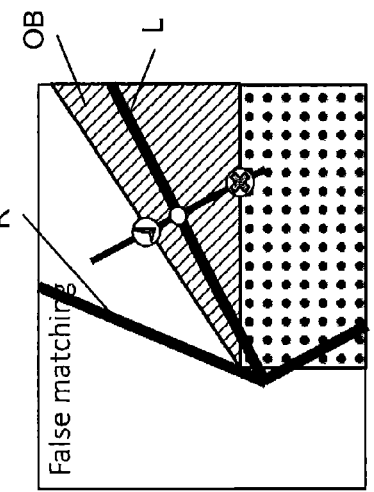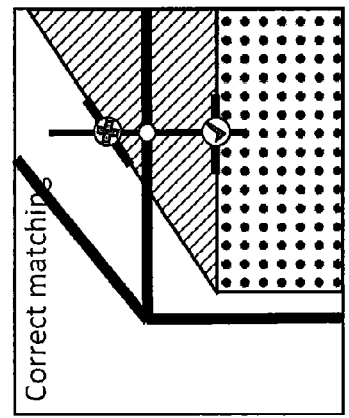
Fig. 5C　　　　　　　　　　Fig. 5D

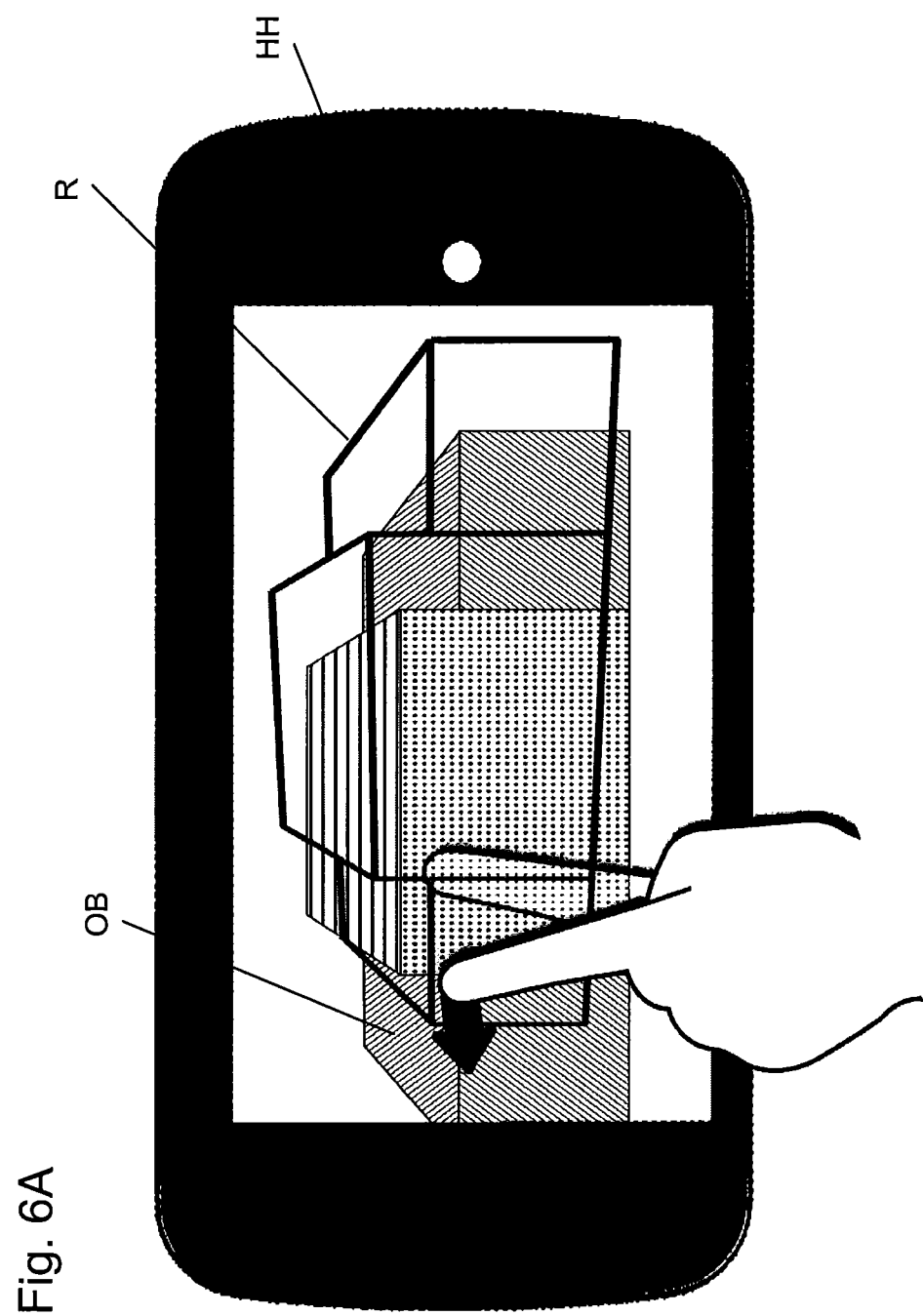

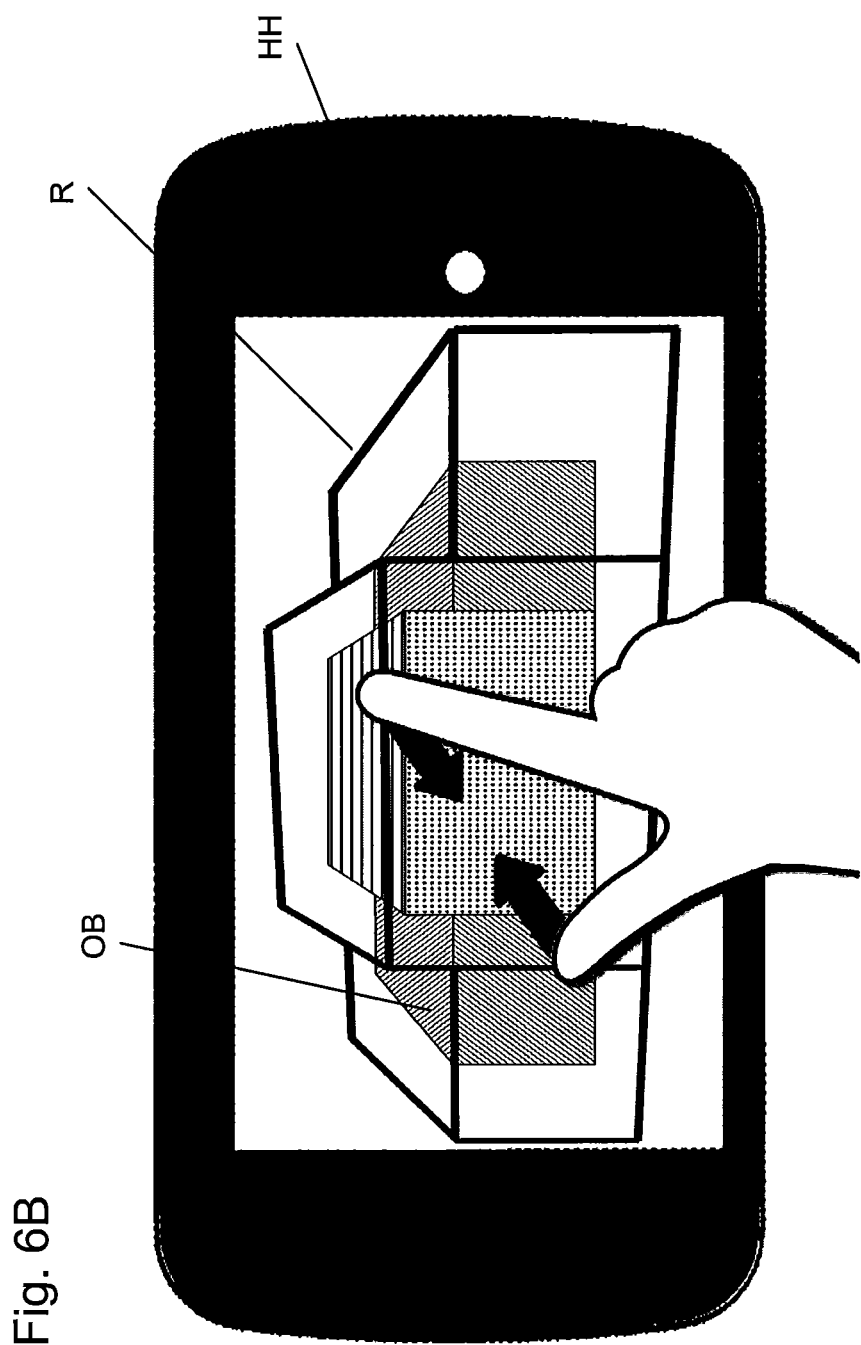

METHOD OF DETERMINING A POSITION AND ORIENTATION OF A DEVICE ASSOCIATED WITH A CAPTURING DEVICE FOR CAPTURING AT LEAST ONE IMAGE

This application is entitled to the benefit of, and incorporates by reference essential subject matter disclosed in PCT Application No. PCT/EP2012/069075 filed on Sep. 27, 2012.

BACKGROUND OF THE INVENTION

1. Technical Field

The present invention relates to a method of determining a position and orientation of a device, wherein the position and orientation is determined based on multiple degrees of freedom and the device is associated with a capturing device for capturing at least one image. The invention also relates to a computer program product comprising software code sections for performing the method.

2. Background Information

Localization of a moving capturing device, such as a camera, or a moving device equipped with a capturing device, such as a camera, with respect to objects in a coordinate system attached to the objects (defining a reference origin and a reference orientation of the axes of the objects) is an important task in the field of computer vision. Many different approaches have been proposed, which use a different system setup, use different sources of input data and/or are processing the input data in different ways.

One big class includes vision-based localization, in which the data captured from one or multiple cameras, such as but not limited to visual light cameras, infrared cameras, time-of-flight cameras, depth camera systems, scanning systems or any other system providing some kind of image from the objects to be localized to, are analyzed and used for alignment with already known or during runtime learned representations of the objects. The proposed method in this application according to the invention, as set out below, can be applied to any of the previously mentioned capturing devices.

The representations of the objects might be, but are not limited to markers, blue prints, images, templates, textured and non-textured polygonal models, textured or non-textured CAD models, feature point maps, point clouds, line, segment, silhouette, or depth representations. The image of the system can be analyzed in different ways to extract information, such as but not limited to intensities, gradients, edges, lines, segments, corners, descriptive features or any other kind of features, primitives, histograms, polarities or orientations. The proposed method in this application according to the invention, as set out below, can be applied to any of the previously mentioned object representation and can use any of the previously mentioned extracted image information.

Other approaches make use of data from sensors attached to the camera, such as but not limited to compass, GPS, inertial sensor, accelerometer, gyroscope, magnetometer, odometer, mechanical sensors like rotary encoder, or results from tracking systems such as measuring arms or laser tracker. These sensors either provide measurements directly with respect to the coordinate system of the objects the camera needs to be localized to or are integrated in calibrated systems which provide this data after some processing of the raw sensor data and potentially additional information of the system. The proposed method in this application according to the invention, as set out below, can be implemented to use any of the previously mentioned sensors.

Another class of approaches for localization of a moving camera or device is outside-in systems, which determine the pose of the device from outside. These systems can be rigidly registered to the objects coordinate system or can dynamically be localized with respect to the objects coordinate system themselves. The moving camera or device to be localized might, but does not have to be attached with active or passive tools or markers, such as but not limited to visible light or infrared markers or laser reflectors, which are recognized by the corresponding outside-in system and used for localization.

A broad field of further approaches is combining the different systems, sensors and approaches in a procedural or integrated way.

Within the vision-based localization the edge-based approaches use representations of the objects which result in a set of but not limited to edges, lines, gradients, segments, borders, silhouettes, contours, edgelets, orientations and/or polarities in an image of the object captured with the camera system to be localized.

Edge based approaches have the advantage of being robust to illumination changes and light conditions, work on poorly textured objects and are usually robust to partial occlusion. The object information needed for edge based localization can be extracted manually, semi-automatic or fully automatic from different sources of representations of the objects, such as but not limited to textured or non-textured polygon or CAD models or scenes, blue prints, images, feature maps, point clouds, models of lines, segments, or silhouettes, depth representations or scans.

A standard approach of these systems works by matching correspondences in the image for the known representation of the objects and perfoiming an optimization, such as but not limited to a least squares minimization, on these correspondences to estimate the position and the orientation of the camera. This matching and optimization procedure is generally embedded into an iterative framework, which performs the matching based on an initial pose which is updated during optimization and its update is used as another initial pose in the next iteration of the optimization. After a certain number of iterations, the pose estimation can converge to the true pose to be found.

The known representation of the objects is projected into the camera image based on known camera intrinsic parameters and a first rough localization, which can be provided but is not limited to the last frame in a frame-to-frame tracking system, see for example FIG. 1. The example of FIG. 1 shows a projection of a 3D line model (digital representation R of object OB) based on a rough initial camera localization, in which one orientation (here the gravity) is reliably provided. This pose could be computed directly from given GPS, compass and accelerometer sensor data of the capturing device. While GPS and compass are not reliable, the gravity is provided sufficiently accurate for the final pose and thus does not need to be optimized.

Based on a given camera pose C of form $$C = \begin{bmatrix} R & t \\ 0 & 1 \end{bmatrix}$$

where R is a 3×3 rotation matrix and t is a 3×1 translation vector, a homogenous 3D point x of form $x=(x, y, z, 1)^T$ is projected into the image to point $(u, v)^T$ with function $$\begin{pmatrix} u \\ v \end{pmatrix} = proj(Cx)$$

(referenced as equation 1 in the later text), where function proj(.) models the projection from camera to image coordinates based on known camera intrinsic parameters.

Correspondences of the projected representation of the objects in the image are searched by sampling the resulting projection representation such as but not limited to edges, lines, borders or silhouettes to tracking nodes, edgelets or sample points and for each of them searching within some search range within their neighborhood, such as but not limited to a search along their noimal, for gradient maxima, see FIG. 2. While some approaches keep the nearest gradient maxima as correspondence pixel for the projected point (e.g., See T. Drummond, R. Cipolla. Real-time tracking of complex structures with on-line camera calibration. British Machine Vision Conference, 1999), others take the biggest gradient maxima (e.g., See A. I. Comport, E. Marchand, M. Pressigout, F. Chaumette. Real-Time Markerless Tracking for Augmented reality: The Virtual Visual Servoing Framework. Transactions on Visualization and Computer Graphics, 2006; hereinafter referred to as "Comport"). To be robust against motion blur some might search for intensity ramps instead of intensity steps; e.g., See G. Klein, D. Murray. Improving the Agility of Keyframe-Based SLAM. European Conference on Computer Vision, 2008; hereinafter referred to as "Klein"). In Tamaazousti (i.e., M. Tamaazousti, V. Gay-Bellile, S. N. Collette, S. Bourgeois, M. Dhome. Real-Time Accurate Localization in a Partially Known Environment: Application to Augmented Reality on textureless 3D Objects. TrakMark, 2011; referred to hereinafter as "Tamaazousti") the nearest gradient maxima with an almost similar orientation is kept as correspondence for each point of the projection into the registered images (keyframes) of a bundle adjustment system. The projection into the registered images is using a computed camera pose obtained from a visual tracking algorithm that requires a set of consecutive images with small inter-image displacements. The bundle adjustment provides 6 degrees of freedom estimations for each of these images.

In Tamaazousti the full 6 degrees of freedom pose is assumed to be of high confidence, which allows additional checks like the view dependent orientation check. Additionally, the approach presented in Tamaazousti requires a set of registered images obtained from the tracking of consecutive images with small inter-image displacement.

The distance $d_j$ between each projected point $(u, v)_j$ and its found correspondence in the image is a single measurement to be optimized.

Based on the pose C of the current iteration used for projection of the representation of the objects into the image an update transformation T is computed, such that the updated camera pose $C'=TC$ minimizes the distance d between the set of m reprojected points of the representation of the objects and their matched image correspondences.

This transformation update T is parameterized by the six vector a corresponding to the exponential map parameterization of the Lie group se(3):

$$T(a) = expm\left(\sum_{i=1}^{6} a_i A_i\right)$$

(referenced as equation 2 in the later text) with expm(.) being the exponential map, $a=[a_1\ a_2\ a_3\ a_4\ a_5\ a_6]$, $a_1$ to $a_3$ representing the rotation and $a_4$ to $a_6$ representing the translation of T. The corresponding generator matrices $A_i$ of the group can be chosen as the following matrices (referenced as equations 3 in the later text):

$$A_1 = \begin{bmatrix} [e_1]_x & 0 \\ 0 & 0 \end{bmatrix},$$

$$A_2 = \begin{bmatrix} [e_2]_x & 0 \\ 0 & 0 \end{bmatrix},$$

$$A_3 = \begin{bmatrix} [e_3]_x & 0 \\ 0 & 0 \end{bmatrix},$$

$$A_4 = \begin{bmatrix} 0 & e_1 \\ 0 & 0 \end{bmatrix},$$

$$A_5 = \begin{bmatrix} 0 & e_2 \\ 0 & 0 \end{bmatrix},$$

$$A_6 = \begin{bmatrix} 0 & e_3 \\ 0 & 0 \end{bmatrix}$$

with $e_1, e_2, e_3$ being the canonical basis for $R^3$ and $[.]_x$ being a skew symmetric matrix as $$\begin{bmatrix} x \\ y \\ z \end{bmatrix}_x = \begin{bmatrix} 0 & -z & y \\ z & 0 & -x \\ -y & x & 0 \end{bmatrix}$$

The partial differentiation of T(a) around the origin (a=0) as needed for minimization is $$\frac{\partial}{\partial a_i} T(a) = A_i$$

The Jacobian matrix J is obtained by the differentiation of the projection of points into the image (see equation 1) with respect to a $$J_{j,i} = \frac{\partial d_j}{\partial a_i}$$

where the Jacobian J is of dimension m×6.
To find the parameters of the transformation update a the following equation is solved $$Ja=d$$

where d is the m-dimensional vector of single distance measurements $d_j$.
For standard least-squares optimization the solution in a given iteration takes the following form $$a=(J^T J)^{-1} J^T d$$

To be robust against outliers a robust M-estimator can be used to solve for the transformation update (e.g., See Comport; and C. Wiedemann, M. Ulrich, C. Steger. Recognition and Tracking of 3D Objects. Deutsche Arbeitsgemeinschaft für Mustererkennung, 2008; and L. Vacchetti, V. Lepetit, P. Fua. Combining edge and texture information for real-time accurate 3D camera tracking. International Symposium on Augmented and Mixed Reality, 2004; referred to hereinafter as "Vacchetti").

In hybrid systems, see FIG. 7A, using additional sensor data, such as GPS, accelerometer, gyroscope and magnetometer the sensor data might be used for initialization of a vision based approach (e.g., See J. Karlekar, S. Z. Zhou, W. Lu, Z. C. Loh, Y. Nakayama, D. Hii. Positioning, Tracking and Mapping for Outdoor Augmentation, International Symposium on Augmented and Mixed Reality, 2010; referred to hereinafter as "Karlekar"), or combined with the results from the optical tracking by sensor fusion using e.g. extended Kalman filter; e.g., See G. Reitmayr, T. W. Drummond. Going out: Robust Model-based Tracking for Outdoor Augmented Reality, International Symposium on Augmented and Mixed Reality, 2006; referred to hereinafter as "Reitmayr". The sensor fusion based on Kalman filters requires an estimation of statistics like covariance matrices of the sensors. As set out below, the present invention does not require such estimations and it is based on a completely different approach.

Proposed solutions to the limitations of the standard approaches:

Whether the pose optimization based on correspondences between the known representation of the objects and their matched representation in the image will successfully converge to a correct camera pose highly depends on the initial pose used as starting point for the localization, the used pose estimation approach and the correctness of the correspondences. False correspondences can result from but is not limited to noise in the image, occlusion of the object in the image, undersized search range or false choice of the correspondences due to multiple reasonable matching candidates within the used description space for comparison. The probability of the latter one increases with the search range in the image in which a correspondence needs to be searched. This limits the offset between the initial cameras pose used as starting point for the localization and the correct cameras pose to be found by the approach for which a correct localization can be performed.

Different approaches try to overcome a small search range by increasing the correctness of correspondences by allowing multiple hypotheses for correspondences and adapting the pose estimation such that it will choose the best correspondence during optimization of the 6 degrees of freedom pose; e.g., See Vacchetti and H. Wuest, D. Stricker. Tracking of industrial objects by using CAD models, Journal of Virtual Reality and Broadcasting, Volume 4, 2007. Other approaches try to improve the description of the gradient maxima to increase the reliability of the matching process by e.g. using the polarity of the gradient (e.g., See Klein).

In summary, existing approaches for vision-based localization are not robust when the localization is performed with respect to a complex object within a complex scene, i.e. they generally fail when localizing a camera attached to mobile device in an outdoor environment. For instance, and more practically, state-of-the-art methods do not solve the problem of localizing a camera with respect to a building façade with known model and the appearance of which has partly changed (e.g. due to open/closed windows/doors, different painting of part of it, changed trees structure in its neighborhood over the seasons) since the registration based on visual data fails as it falls into incorrect local minima during the alignment algorithm.

It would therefore be beneficial to provide a more robust method of determining a position and orientation of a device based on multiple degrees of freedom, with the device being associated with a capturing device for capturing at least one image, which is capable to avoid the aforementioned disadvantages.

SUMMARY OF THE INVENTION

According to an aspect of the present invention, there is provided a method of determining a position and orientation of a device, wherein the position and orientation is determined based on multiple degrees of freedom and the device is associated with a capturing device for capturing at least one image, the method comprising the steps of:
    capturing at least one image of at least one real object or part of a real object with the capturing device, and providing a coordinate system in relation to the object,
    providing an estimation of intrinsic parameters of the capturing device,
    providing pose data allowing to compute at least one first degree of freedom in the coordinate system having a first confidence degree, and at least one second degree of freedom in the coordinate system having a second confidence degree different from the first confidence degree,
    calculating an initial pose of the device with respect to the object based on the first and second degrees of freedom having the first and second confidence degree,
    performing a pose estimation process for determining an estimated position and orientation of the device with respect to the object, and calculating in the pose estimation process an estimation of the degrees of freedom having the second confidence degree based on the initial pose and the at least one image and the estimation of intrinsic parameters of the capturing device,
    determining a position and orientation of the device with respect to the object based on the estimation of the degrees of freedom calculated in the pose estimation process and the degrees of freedom having the first confidence degree.

According to an embodiment, the degrees of freedom having the first and the second confidence degree are computed from pose sensor data provided by a set of sensors or a combination of sensors.

In an advantageous implementation of the invention the pose data includes a confidence value that allows computing the confidence degree of the degrees of freedom.

For example, the pose data is provided from any one of or a combination of the following sensors: an accelerometer, a gyroscope, a global position sensor, an inertial sensor, a magnetometer, an odometer, a mechanical sensor, a rotary encoder, a tracking sensor, a measuring arm, a laser tracker.

Part of the degrees of freedom having the first confidence degree may advantageously be computed from pose data that are indicative of a gravity vector of the device or of the capturing device which allows for determining an orientation with respect to gravity.

For example, the pose data is provided from a gravity sensor or combination of sensors indicative of a gravity vector, particularly from an accelerometer and/or from a gyroscope.

Accordingly, an aspect of the present invention proposes a new approach to improve position and orientation vision-based localization of a capturing device, particularly a camera, or a device equipped with a capturing device with respect to objects with some partly known representations in a coordinate system attached to the objects in case one or more degrees of freedom are known in the coordinate system attached to the objects with a certain confidence degree. The vision-based localization can employ any additional position and orientation sensors providing measurements on the different degrees of freedom with heterogeneous confidence degrees, i.e. sensors with different accuracy and precision. Furthermore, the approach can benefit from any additional input coming from a potential user that can interact with the camera or with the device equipped with the camera to support the localization.

In order to overcome principal vision-based localization problems in complex appearance environments as described above, according to an aspect it is proposed to cluster the additional sensor data into high confident and low confident groups and generate high confident and low confident degrees of freedoms. Then, the high confident degrees of freedom are used to generate the correspondence of the visual features between the image and the used object representation. The low confident degrees of freedom are optimized based on the obtained correspondences results. A cost function based on the correspondences is used during the optimization.

The above proposed aspects of this invention allow solving the challenging robustness problem of existing approaches for vision-based localization when the localization is performed with respect to a complex object within a complex scene. The registration based on visual data succeeds as it avoids falling into incorrect local minima during the alignment algorithm. For instance, the problem of localizing a camera with respect to a building façade with known model and which appearance has partly changed, e.g. due to open/closed windows/doors, different painting of part of it, changed trees structure in its neighborhood over the seasons, is possible with the proposed approach.

Modern handheld devices provide sensor data with varying confidence values, such as the device position by GPS sensor, digital compasses measure the orientation of the device with respect to north and inertial sensors provide the device orientation with respect to gravity. While, e.g., the GPS and the digital compass data in current systems are not of very high confidence, the devices orientation with respect to the gravity vector can be provided with high reliability.

While, e.g., in reference Tamaazousti the full 6 degrees of freedom pose is assumed to be of high confidence, which allows additional checks like the view dependent orientation check, aspects of the present invention propose an increase of the correctly matched correspondences of a very rough 6 degrees of freedom pose with different confidences in the different degrees of freedom of the pose, by taking the fact into account that some of the degrees of freedom, such as some of the rotation parameter, are provided with a high confidence. This will allow additional checks on properties which are highly dependent on the confident degrees of freedom. Especially that, as later explained again, the orientation of a part of a projection into the image depends highly on the pose used for projection, and in general pose errors in rotation will have a higher impact on the error of orientation of projected lines than pose errors in translation. Additionally, the approach presented in Tamaazousti requires a set of registered images obtained from the tracking of consecutive images with small inter-image displacement, while the method proposed with this invention does not require any image with prior pose knowledge and the proposed method allows the localization based on the processing of one single image. The only image required for the proposed method of this invention is the image acquired at the moment for which the camera position and orientation is estimated. The proposed method of this invention does not need a prior knowledge coming from a second or previous frame or the result of the processing of a second or a previous.

Accordingly, in an aspect there is proposed a new approach to improve position and orientation localization of a camera with respect to objects with some partly known representations in a coordinate system attached to the static objects in case one or more degrees of freedom are known with a certain confidence. Therefore systems providing some degrees of freedom with high confidence of the camera's pose with respect to the coordinate system the camera is to be localized to can benefit from this approach, such as but not limited to smart phones, tablets, cameras with inertial sensors, pan-tilt-zoom cameras or other camera systems with mechanical sensors or registration systems providing only some degrees of freedom with high confidence.

On the scenario side any static or partly static object within the coordinate system of its representation for which some degrees of freedom are known can benefit from this approach. In the example of using the sufficiently reliable inertial sensor of modern handheld devices to provide a fairly good estimation of the gravity, any scenario containing objects represented in this gravity aligned coordinate system can benefit from the proposed approach, e.g. gravity aligned representations of an outdoor environment like a city (like buildings, streets, signs, installations, etc.), indoor environments (like, rooms, furniture, TV screens, paintings (as long as these objects are either placed gravity aligned or the model represents their orientation with respect to the gravity correctly)), or moving objects like cars (as long as they move gravity aligned with respect to their representation).

According to an embodiment of the invention, there is provided a digital representation of the object, and the pose estimation process is performed based on the digital representation of the object projected into the image using the initial pose. For example, the pose estimation process includes matching at least one feature of the object in the at least one image with at least one feature of the digital representation, and the estimation of the degrees of freedom is determined based on feature correspondences determined in the matching process.

In a particular implementation, the first confidence degree is indicative of a higher confidence degree, particularly indicative of a higher accuracy or precision, and the second confidence degree is indicative of a lower confidence degree, particularly indicative of a lower accuracy or precision.

According to an embodiment, the method further includes the step of providing a user input that comprises interaction with any one of the device, the capturing device, the captured image, a digital representation of the object, a projection of a digital representation of the object projected into the image. For example, the interaction includes any one of or any combination of the following: moving the capturing device with respect to the object, translating, scaling, rotating the digital representation, particularly by moving, pinching, and/or rotation gestures on a touch screen or in a gesture recognition system, or by speech commands in a speech recognition system. According to a further example, the interaction includes performing in a manual or semi-automatic procedure a selection, segmentation, and/or drawing on the view of the object in the image, particularly retracing the object in the image to support a matching process performed in the pose estimation process. The user input may be processed to adapt at least part of the degrees of freedom having the second confidence degree.

According to an embodiment, the projection of the digital representation of the object projected into the image is transformed (particularly, translated or rotated or scaled) by user input from a first projection to a second projection in the image, wherein the transformation is a basis for adapting at least part of the degrees of freedom having the second confidence degree.

Particularly, the adapted degrees of freedom having the second confidence degree is used for calculating the initial pose of the device.

According to an embodiment, the method further uses additional descriptions for matching a digital representation of the object with the object in the image, wherein the descriptions are dependent on the confidence degree of the respective degree of freedom or on a respective pose estimation calculated during the pose estimation process.

Particularly, the pose estimation process may include matching at least one feature of the object in the at least one image with at least one feature of the digital representation, and determining the estimation of the degrees of freedom based on feature correspondences determined in the matching process. Generally, from possible feature correspondences candidate correspondences in the image with approximately the same orientation to the projected part of the digital representation may be selected.

For example, the search direction and/or the search range for determining the feature correspondences during the matching process is constrained by the degrees of freedom having the first confidence degree.

In a further embodiment, in order to judge whether object localization was successful, a score is used representing a probability of a correct pose and a ratio stating on the reliability of the score. More particularly, in order to calculate the score the orientation of the projected digital representation into the image based on the pose to evaluate is compared with the orientation found in the image at the positions of the projection in the image.

For example, the ratio stating the reliability of the score is computed based on the size of the part of the digital representation used to compute the score with respect to the total size of the digital representation projected into the captured image.

The determined estimated position and orientation of the device may be used to initialize any image-to-image tracking process, in which the detetmined estimated position and orientation of the device is used as a first pose for tracking with respect to another image. For example, in the image-to-image tracking process at least the degrees of freedom having the second confidence degree is not used anymore after the estimated position and orientation of the device has been determined in an initial image. Further, correspondences of a projected digital representation of the object in the image may be used as features which are matched, detected or tracked in another image.

According to an embodiment, the method is a method for determining a position and orientation of a device with respect to an object in an augmented reality application or robotic system navigation.

The method according to the invention is performed on a computer system, such as a stationary or mobile computer system, preferably on handheld devices as mentioned above.

The invention also relates to a computer program product adapted to be loaded into the internal memory of a digital computer system, and comprising software code sections by means of which the steps according to any of the above aspects and embodiments are performed when said product is running on said computer system.

BRIEF DESCRIPTION OF THE DRAWINGS

Further aspects, advantageous features and embodiments of the invention will be evident from the following description in connection with the drawings.

FIG. 2 shows examples of 2D/3D correspondence computation.

FIG. 3 depicts an exemplary scene of a projection of a 3D line model (digital representation R of object OB) in the camera image of OB based on a result of a possible 6 degrees of freedom pose estimation compared to a given reliable gravity and 4 degrees of freedom pose estimation.

FIG. 5 depicts examples for explaining dependency of orientation of a projected line to projection pose in accordance with the first and second aspect of the invention.

FIG. 6 shows examples of possible interactions of a user with touch based systems to update a rough initialization.

DETAILED DESCRIPTION OF THE INVENTION

Figure 7A:
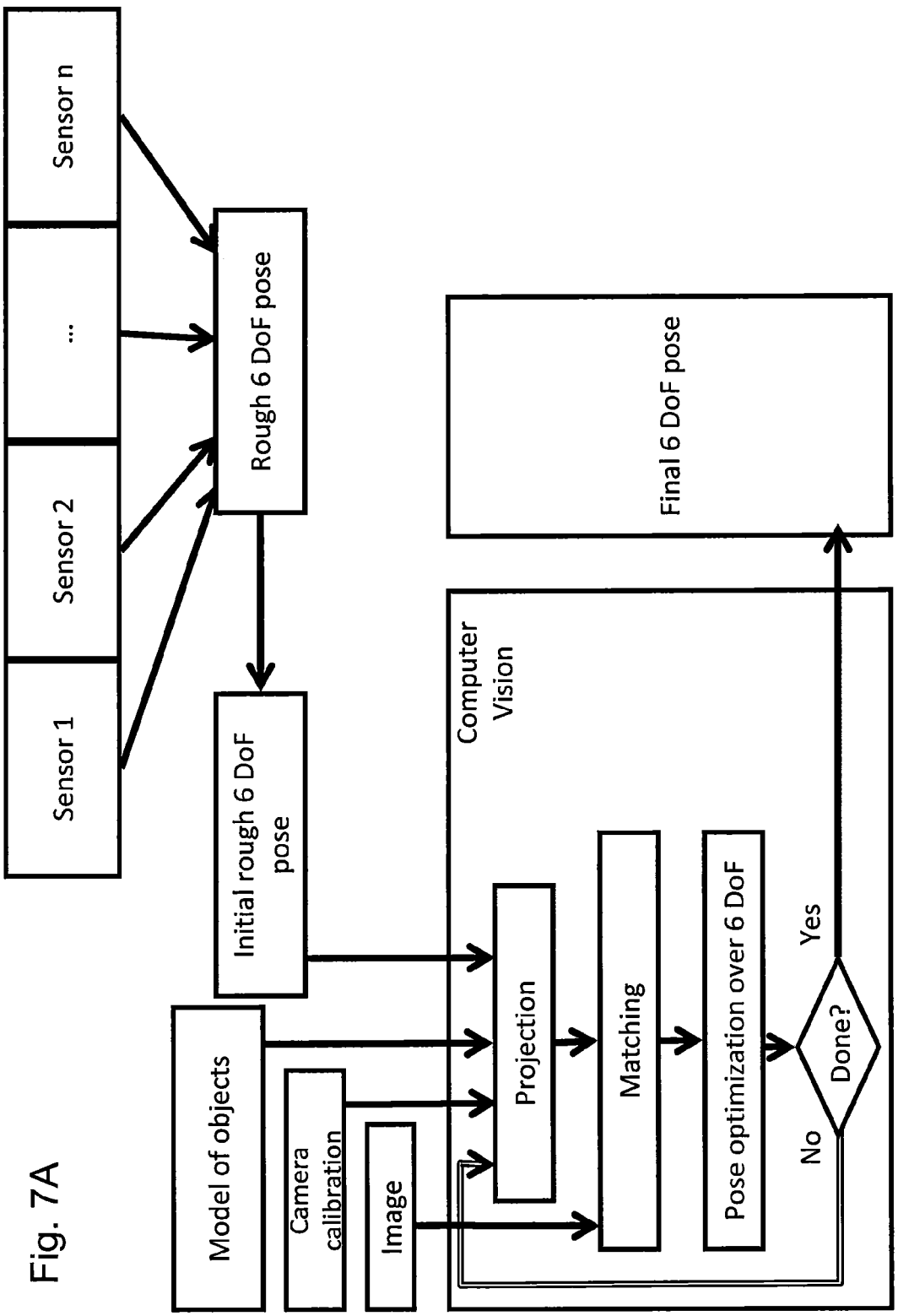
FIG. 7 shows flow chart diagrams of a process for determining position and orientation of a camera according to state of the art.
Figure 7B:
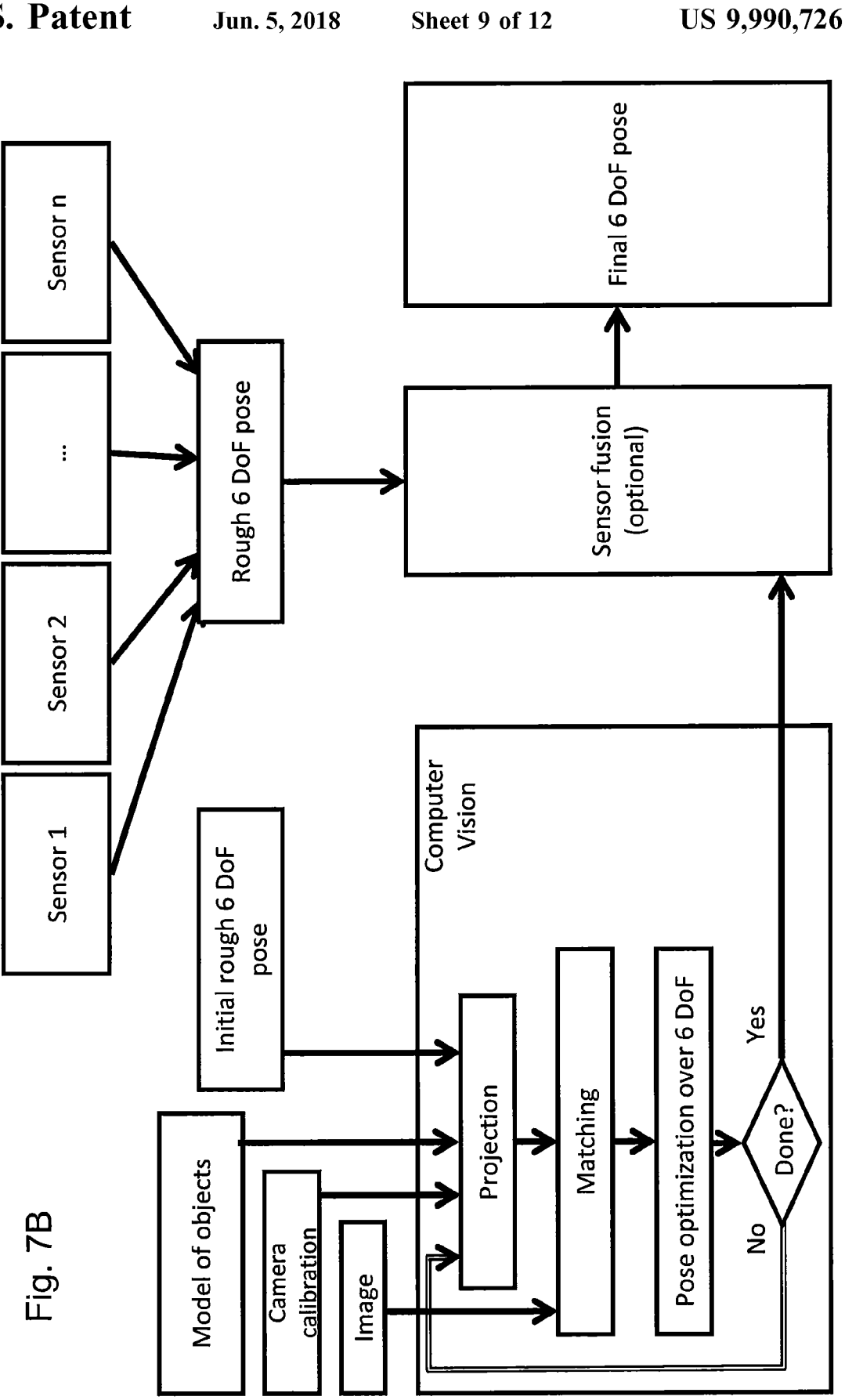

In the following, aspects of the invention will be explained in more detail in connection with the drawings. In this regard, FIG. 7 shows a flow chart diagram of a process for determining position and orientation of a camera according to state of the art. Particularly, FIG. 7A shows a state of the art method with usage of vision-based localization with using different sensors data for computing an initial pose for final pose estimation, like in Karlekar. FIG. 7B shows a state of the art method with usage of vision-based localization with using different sensors data for sensor fusion like in Reitmayr. As these methods are well known in the art, as evident from the cited references, any further explanation of the methods are not set out in detail herein for reasons of brevity.

Figure 8A:
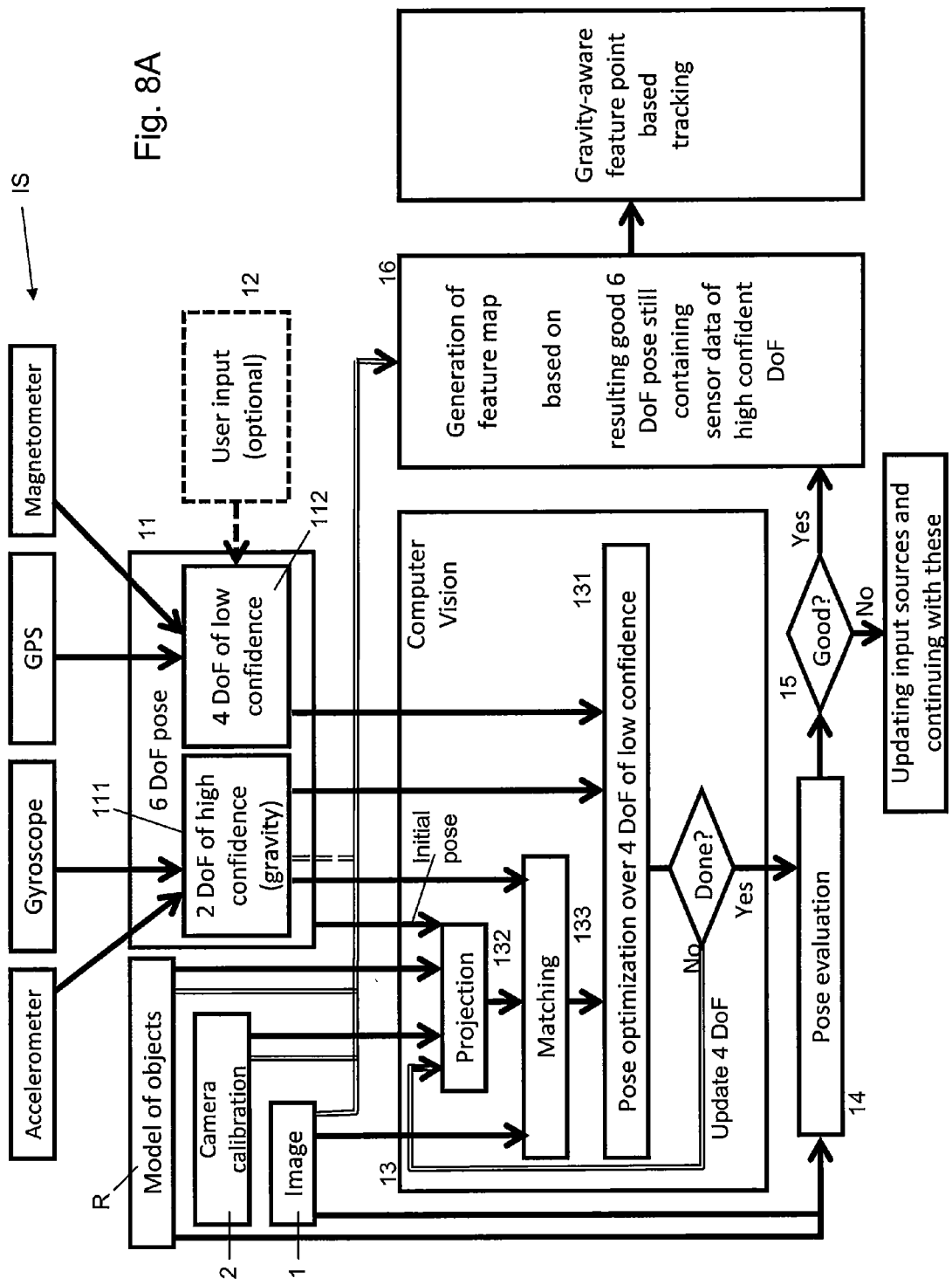
FIG. 8 shows flow chart diagrams of a process for determining position and orientation of a camera according to embodiments of the invention.
Figure 8B:
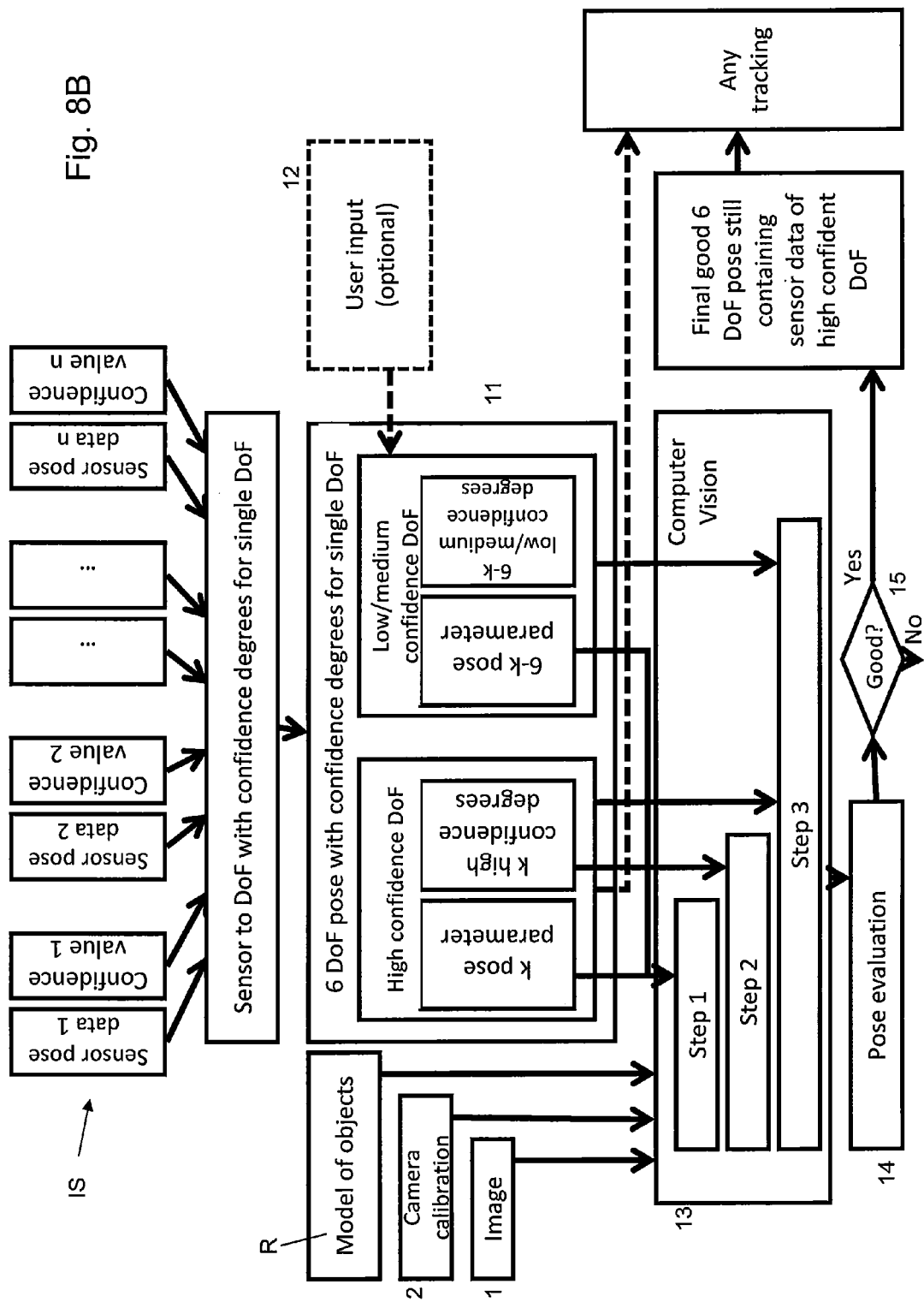

FIG. 8 shows a flow chart diagram of a process for determining position and orientation of a camera according to an embodiment of the invention. Particularly, FIG. 8A shows an embodiment of an integrated way of using different sensors and degrees of freedom (in the following shortly: DoF) with varying confidence as proposed according to this invention. FIG. 8B shows another embodiment of an integrated way of using different sensors and DoF with varying confidence as proposed according to this invention. The following description of aspects of the invention is referring to steps as shown in the FIGS. 8A and 8B.

Basic steps in a method of determining a position and orientation of a device according to the invention are illustrated in FIG. 8. It comprises capturing at least one image with the capturing device of at least one real object or part of a real object (block 1), providing a coordinate system in relation to the object, and providing an estimation of intrinsic parameters of the capturing device, such as in a camera calibration (block 2). Moreover, pose data are provided allowing to compute a first degree of freedom in the coordinate system (block 111) having a first confidence degree (here: higher confidence degree), preferably from appropriate input sensors IS with corresponding confidence values, and at least one second degree of freedom in the coordinate system (block 112) having a second confidence degree (here: lower confidence degree).

An initial pose of the device with respect to the object is calculated based on the first and second degrees of freedom (blocks 13 and 14). In block 13, a pose estimation process is performed for determining an estimated position and orientation of the device with respect to the object, wherein in the pose estimation process an estimation of the degrees of freedom having the lower confidence degree is calculated (block 131) based on the initial pose (block 11), the at least one image (block 1), the estimation of intrinsic parameters of the capturing device (block 2) and the representation of the object (block R). In this example, the pose estimation involves projection of the digital representation of the object into the image (block 132) and matching of features (block 133) as set out in more detail below. If the pose evaluation is found to be not well (block 15), the method continues with updating the input sources like but not limited to the input sensors (IS), the user input (block 12) and/or the image (block 1), and continuing with these. The position and orientation of the device with respect to the object is determined based on the estimation of the degrees of freedom calculated in the pose estimation process 13 and the degrees of freedom having the first confidence degree (as provided in block 111).

FIG. 8A provides a particular implementation involving projection of a representation of the object, matching and pose optimization process which are, however, not necessarily required according to the present invention. In this regard, FIG. 8B shows a more general approach involving the concepts of the invention as set out herein generally comprising a pose estimation process which may involve any appropriate steps as known in the art (which are referred to herein simply as steps 1 to 3).

In an aspect of the invention, a localization system of a camera is proposed which combines different input sources, such as accelerometer, gyroscope, GPS, magnetometer, and processes the data in a new way that allows the localization of the camera in complex environments, see FIG. 8. According to an embodiment, the input sources are:

Image data of some object of interest captured by the camera. The images can be captured by a camera like but not limited to visual light cameras, infrared cameras, time-of-flight cameras, depth camera systems, scanning systems or any other system providing some kind of image from the objects to be used for the localization. The object of interest is used for the camera localization in a certain coordinate system called target coordinate system. In case the camera location is done in a target coordinate system attached to earth, a building can play the role of an object of interest. More generally, the camera coordinate system might be the earth coordinate system.

A representation of the object of interest, which consists in a set of features, such as but not limited to edges, lines, gradients, segments, borders, silhouettes, contours, edgelets, orientations and/or polarities in an image of the object. The representation can be known a priori or be created and updated during run-time.

Any additional position and orientation data providing measurements of the different degrees of freedom with their respective confidence values, i.e. sensors with individual accuracy and precision, such as but not limited to GPS, inertial sensor, accelerometer, gyroscope, magnetometer, odometer, mechanical sensors like rotary encoder, or results from tracking systems such as measuring aims or laser tracker. These sensors can either provide measurements directly with respect to the target coordinate system or are integrated in calibrated systems which provide this data after some processing of the raw sensor data and potentially additional information of the system. The spatial transformations between the camera and the sensors needs to be known or needs to be evaluated before or during the localization process. The confidence values of different sensors can vary, e.g. a standard GPS embedded in a smart phone gives a position with an accuracy of around 10 meters, the accuracy of a magnetometer depends on the surrounding environment and is often accurate within a few degrees, but could potentially be totally wrong and thus is not reliable. In contrast, the combination of accelerometer and gyroscope build in modern handheld devices to measure gravity orientation can be provided in a fairly high accuracy; e.g., See D. Kurz, S. BenHimane. Inertial sensor-aligned visual feature descriptors. Computer Vision and Pattern Recognition, 2011.

Furthermore, the approach could benefit from any additional input coming from a potential user that can interact with but not limited to the camera or the device equipped with the camera, with the representation of the objects, their projection into the image or with their image to correct part of the sensors' inaccuracies.

Camera intrinsic parameter estimation

In the following, when referring to camera localization, it is generally referred to determining a position and orientation (pose) of the camera or of a device provided with or associated with the camera. To start the optimization of the camera localization, in this embodiment an initial pose is provided with known confidence degrees for the different degrees of freedom, such as but not limited to a pose which is reliable in one orientation (see block 11 in FIG. 8). As an example, this can be achieved by but is not limited to using the above mentioned handheld devices. An initial pose can be composed e.g. by the sensor data from GPS, magnetometer (digital compass) and accelerometer/gyroscope. While the GPS and compass data are not accurate enough in current systems for a good pose estimation without further optimization and thus have a low confidence value, the accelerometer and gyroscope sensor, which provide the orientation of the device in relation to the world's gravity (2 degrees of freedom), is sufficiently precise to be used for the final localization result and thus has a high confidence value. Even though the GPS, which provides the translation (3 degrees of freedom) and the digital compass, which provides the rotation around the gravity (1 degree of freedom), are not sufficiently accurate to be directly used for the final pose estimation, they can often serve a first rough initial estimation in the 4 degrees of freedom they cover.

If needed to achieve an even better and sufficiently rough initial estimation of the uncertain degrees of freedom an additional update of the alignment within these uncertain degrees of freedom could be perfoimed coming from but not limited to interactions from a potential user (block 12 in FIG. 8) or a different approach before proceeding with the localization and optimization approach proposed in this patent. Among others following interaction modalities are possible to provide the user input to the system: To give feedback to the user about the current displacement resulting from the current rough initialization the representation of the objects can be projected and overlaid onto the systems display, such as but not limited to the cameras stopped or continuously streaming current view in a video-see-through display system like but not limited to a touch screen of a modern handheld device or the current users view in an optical-see-through display system, based on the current rough initialization including the current update from the user and further needed system information, like camera intrinsic parameter estimation. Based on this updated feedback of the displacement the user can interact with the system, such that the projection gets roughly aligned with the corresponding real objects or their image in the camera view. This interaction can be performed but is not limited to interaction with the camera or the device equipped with the camera, with the representation of the objects, their projection into the image or with their image. Samples for this interactions are but are not limited to moving the camera with respect to the objects, translating, scaling or rotating the representation of the objects by e.g. but not limited to performing moving, pinching or rotation gestures on a touch screen with one or multiple finger touches or in a gesture recognition system used e.g. in an optical-see-through system using e.g. the fingers or hands for the gestures, or speech commands in a speech recognition system.

In this regard, FIG. 6 is showing such possible interactions on a handheld device HH. Particularly, FIG. 6A shows moving the projection of the representation R of the objects OB with a moving gesture on a touch screen of handheld device HH to roughly align the projection of representation R with the objects OB the camera (on the backside of the handheld HH, not shown) is to be localized to. Thus, possible user input to update a rough initialization is moving the projection of the representation or model R of the objects OB with a moving gesture on a touch screen to roughly align the projection with the objects the camera is to be localized to. FIG. 6B shows possible scaling the projection of the representation R of the objects OB with a scaling gesture on a touch screen to roughly align the projection with the objects the camera is to be localized to. Thus, a possible interaction of a user with touch based systems to update a rough initialization is scaling the projection of the representation or model R of the objects OB with such scaling gesture.

Any updates of the user for the rough alignment are interpreted by the system and added to the already existing initialization.

Another modality of providing additional user input to support the localization is e.g. to allow the user in a manual or semi-automatic procedure to perform some selection, segmentation or drawings on the view of the objects such as but not limited to retracing the objects to support the matching process by e.g. but not limited to performing the matching of the projected representation of the objects to the users input drawings first and then performing a refining based on the image data, by performing the matching on weighted image data whereat the weight are computed based on the provided user input or by performing additional checks based on the user input when choosing between different correspondence candidates.

As a result of using an initial pose, which has high confidence degrees in some degrees of freedom, the pose estimation, such as the one used in standard approaches, can be reduced to a pose estimation of lower confidence degrees of freedom (block 13, particularly block 131 in FIG. 8). This reduces the solution space of the pose estimation. It yields to a more robust pose estimation and allows a higher tolerance to false correspondences. This inherently allows an increased search range to find correspondences in the image for the representation of the objects. In the above given sample of using the high confidence gravity measurement of e.g. modern hand held devices the 6 degrees of freedom reduces to a 4 degrees of freedom (translation and rotation around the gravity orientation) pose estimation.

In this regard, see FIG. 3 showing an example of intermediate results of possible 6 DoF pose estimation (upper depiction), as used in the prior art, compared to a given reliable gravity and 4 DoF pose estimation (lower depiction) according to the present invention. If one orientation of the pose (e.g. the gravity) is already provided reliably, the solution space of the pose estimation (or optimization) reduces and thus within the pose optimization the probability of converging to a correct pose estimation increases.

This can be achieved by replacing the 3 rotation generator matrices (see equations 3 above) by one generator matrix representing the rotation about an axis. The exponential map of a rotation R represented as axis angle rotation is $$R(\alpha,g) = expm(\alpha[g]_x)$$

where g is the 3×1 axis vector of rotation corresponding to the gravity vector and a is the angle of rotation about the rotation axis. This reduces the parameterization of the transformation update T (see equation 2 above) to a four vector $a = [a_1\ a_2\ a_3\ a_4]$ corresponding to the exponential map of form $$T(a) = expm\left(\sum_{i=1}^{4} a_i A_i\right)$$

with $a_1 = a$ representing the angle of rotation about the axis vector and $a_2$ to $a_4$ representing the translation of T.

The corresponding generator matrices of the group are than updated to:

$$A_1 = \begin{bmatrix} [g]_x & 0 \\ 0 & 0 \end{bmatrix},$$

$$A_2 = \begin{bmatrix} 0 & e_1 \\ 0 & 0 \end{bmatrix},$$

$$A_3 = \begin{bmatrix} 0 & e_2 \\ 0 & 0 \end{bmatrix},$$

$$A_4 = \begin{bmatrix} 0 & e_3 \\ 0 & 0 \end{bmatrix}$$

A second improvement to the pose estimation according to aspects of the present invention compared to the standard approaches is the increase of correctly matched correspondences between the image and the representation of the objects. This second improvement may also be part of a separate independent aspect of the invention, as set out in more detail below. As described earlier the standard approaches find the correspondences in the image of the representation of the objects by projecting the representation of the objects into the image based on the current pose and search within some neighborhood of the projection for correspondences in the image. This search can be performed by sampling the resulting projection, such as but not limited to edges, lines, borders or silhouettes, to tracking nodes, edgelets or sample points and for each of them searching within some search range within their neighborhood, such as but not limited to a search along their normal. Within this neighborhood the final correspondence is chosen based on analysis, description and/or checks, such as the closest or maximum gradient maxima.

According to FIG. 2, the standard approach (kind of 3D line model based localization systems) works by finding corresponding edges or gradient maxima in the image for the given 3D lines of the model and estimating the pose of the camera based on these correspondences. The figure shows how the 2D correspondences in the image are searched for the 3D lines of the model: The projected lines in the image of the 3D model (digital representation R of object OB) are sub-sampled. For each of these samples (tracking nodes) a 1D search along each tracking nodes normal N is performed. Along this normal, the next or maximum gradient amplitude is chosen as correspondence point.

FIG. 2A shows an example of a 2D/3D correspondence computation. FIGS. 2B-2D show a respective part of FIG. 2A in greater detail. It can be seen that there are mostly correctly matched features (see FIG. 2B: correct matches M in a simple case), but also some false matches (see FIG. 2C showing one false match F due to matching with the closest gradient maxima), and along some normals N no match was found due to short search range (see FIG. 2D: one search along a normal N, depicted as N1, did not result in any match due to short search range).

According to the invention, an approach is proposed so far which provides confidence in some degrees of freedom of the pose and provides in general more robust pose estimation.

The present invention also proposes as a second independent aspect to use the at least one degree of freedom with high confidence degree to derive image processing methods constrained by the values of the at least one high confidence degree of freedom. Particularly, an image processing method may comprise the steps of providing at least one image of at least one object or part of the at least one object, providing a coordinate system in relation to the image, providing at least one degree of freedom in the coordinate system or at least one sensor data in the coordinate system and computing image data of the at least one image or at least one part of the at least one image constrained by the at least one degree of freedom or the at least one sensor data. For example, the computed image data can be the result of image processing including morphological image operations or image filtering that could be constrained or aligned according to the degrees of freedom with high confidence degree or can be constrained or aligned according to high confident sensors providing data used in the image processing method in relation to the image or a device capturing the image. More specifically, in case the image processing operator of the image processing method comprises image edge detection, generally the image gradient computation comprises applying image filters (such as Sobel filter or Prewitt filters) with kernels aligned with the image axes. This means that generally the kernels produce horizontal or vertical gradient. Given image data with degrees of freedom with high confidence degree such as rotations determined with a gravity sensor assumed to be accurate (wherein the gravity sensor may be associated with the device which captures the image), one could use kernels of filters aligned with the projected orientation of the gravity vector in the image and orthogonal to the projected orientation of the gravity vector in the image.

An embodiment of an image processing method according to the second aspect includes a matching process, such as matching at least one feature of the object in the at least one image with at least one feature of a digital representation of the object.

The image processing method could be used to generate a distance transform image based on the result of the image processing method.

An example usage of the image processing method could include running a global registration algorithm, where different degrees of freedom are iteratively refined and the quality of the iteration is measured by a predefined cost-functions, for example involving a distance transform image. The iterations of the global registration algorithms could be controlled by a particle filter approach.

For example, a device, such as a mobile, stationary or distributed computer system as with the first aspect, which runs an image processing method according to the second aspect is associated with a capturing device for capturing the at least one image, wherein the method further comprises the steps of capturing the at least one image with the capturing device and providing an estimation of intrinsic parameters of the capturing device.

The usage of "the confident degree of freedom constrained image processing operators" of an image processing method, as set out above, can be during matching of correspondences between the image and the representation of the objects. The confident degree of freedom constrained image processing operators can be implemented completely separate and independently from the method of determining a position and orientation of a device as claimed herein in claim 1.

Figure 9:
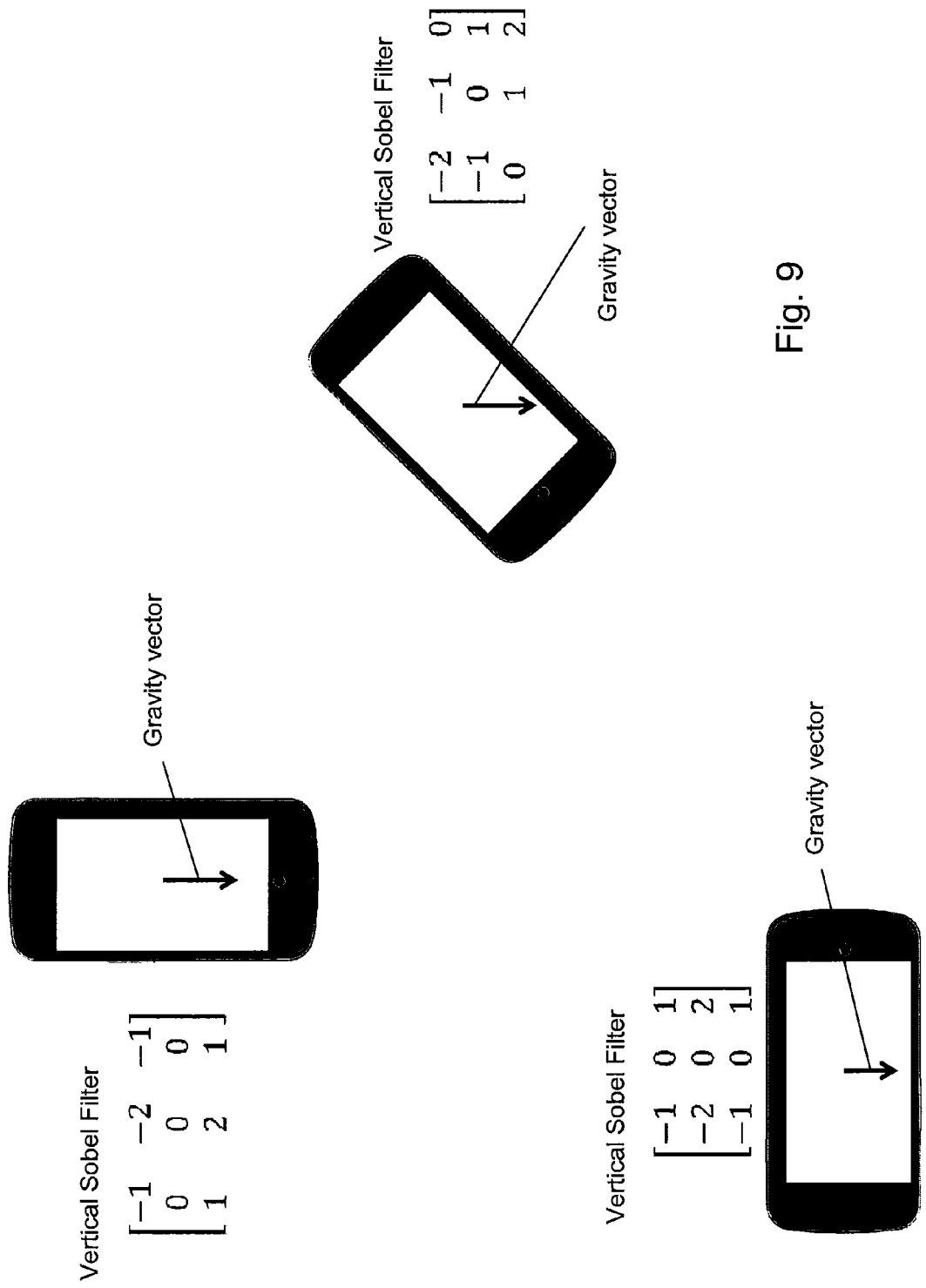
FIG. 9 is related to the second aspect of the invention and shows an example of the changing of an image processing filter according to the direction of the gravity vector with respect to the coordinate system of the device equipped with a camera.

In this regard, it is also referred to FIG. 9. This figure is particularly related to the second aspect of the invention. It shows the changing of an image processing filter according to the direction of the gravity vector with respect to the coordinate system of the device equipped with a camera. In this example, the device is a handheld device as described above. The gravity vector may be provided by a gravity sensor integrated in the device or a combination of sensors indicative of a gravity vector, such as an accelerometer and/or a gyroscope.

Any embodiments and aspects described herein in connection with the first aspect regarding determining a position and orientation of a device as claimed herein in claim 1 can also be combined in respective embodiments with this second independent aspect. Therefore, the subclaims and any further embodiments as included in this application may also be combined with this second independent aspect.

The information of confidence in some degrees of freedom can be used to adapt and/or constrain the matching, such as adapting or adding any analysis, description and/or checks, such as but not limited to morphological operations constrained by the degrees of freedom with high confidence (also called confident degrees of freedom), or checks and additional descriptions which are either dependent on the confident degrees of freedom or on the more reliable full 6 degrees of freedom pose used iteratively during pose optimization. One example is achieved by choosing in a matching process from the possible correspondence candidates in the image, such as but not limited to multiple gradient maxima as candidates for an edge, within the search range in the image, such as but not limited to the search along the normal of the projected line, the one candidate with an almost similar orientation to the projected part of the representation into the image.

Figure 1:
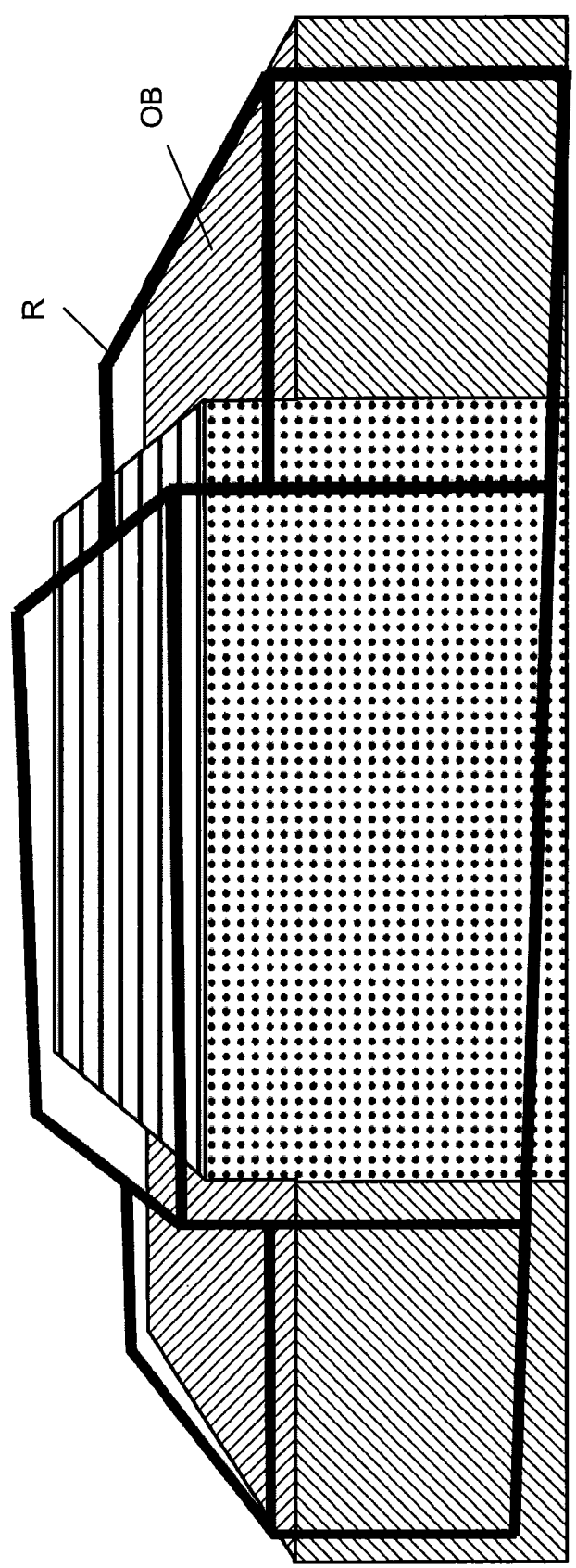
FIG. 1 shows an example of a projection of a 3D line model (digital representation R of object OB) in the camera image of OB based on a rough initial camera localization.
Figure 4:
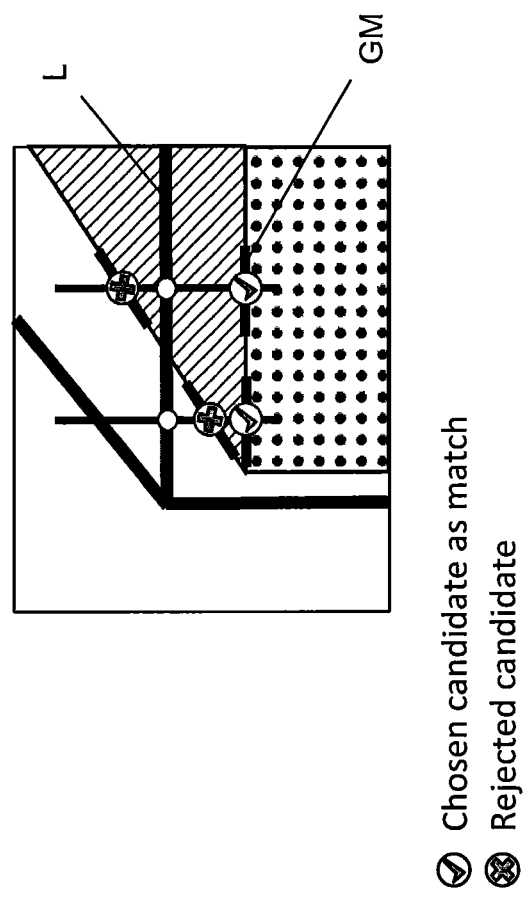
FIG. 4 shows an example of correspondence matching based on orientation similarity in accordance with the first and second aspect of the invention.

According to FIG. 4, to increase the amount of correctly matched correspondences the biggest gradient maxima GM with a similar orientation to the projected line L is chosen as corresponding point.

The orientation of a projected part of the representation R of the objects OB into the image depends highly on the pose used for projection. This is explained in more detail with reference to an example according to FIG. 5: The orientation of a projected 3D line (such as line L in FIG. 5A) of the representation R in the image depends highly on the pose used for projection. Thus, the additional criteria of comparing the orientation of the gradient maxima for determining a correct correspondence will in general improve the result if the projection pose is roughly correct already. In general, errors in rotation will have a greater impact on the error of orientation of projected lines than errors in translation. In the proposed approach of this invention, e.g., two degrees of rotation are already reliably known. Therefore this additional check results in general to a higher amount of correct correspondences for the proposed approach and thus improves the pose estimation further as can be seen in FIG. 5C. FIGS. 5A, 5B and 5D show possible false matching if the proposed method of this invention is not used.

FIG. 5A depicts an example of a possible false matching. Non confident-degrees-of-freedom-constrained pose estimation: In 6 degrees of freedom pose estimation errors can happen in any of the 6 degrees of freedom. This figure shows a possible error in pose estimation in one of the degrees of freedom of rotation. Non confident-degrees-of-freedom-constrained matching: Choosing the closed or maximum gradient maxima will result in the wrong match.

FIG. 5B depicts another example of a possible false matching. Confident-degrees-of-freedom-constrained pose estimation: If pose estimation is constrained to the non confident degrees of freedom the pose estimation becomes more robust. This figure shows that an error in rotation as shown in the FIG. 5A can be eliminated by using confident sensor data in this degree of freedom, given e.g. by a sensor providing a confident gravity vector. Non confident-degrees-of-freedom-constrained matching: Thanks to the more robust sensor-constrained pose estimation the matching will result in general to more correct matches. Anyhow the matching can still result in a wrong match if the closest or maximum gradient maxima is chosen as match.

FIG. 5C depicts an example of a possible correct matching thanks to the proposed method of this invention. Confident-degrees-of-freedom-constrained pose estimation and sensor-constraint matching: If additionally to the constrained pose estimation, which does not add errors in the confident degrees of freedom, the matching adapts to checks, which are dependent on the degrees of freedom which are confident, the correct matches can be increased further. This figure shows that adapting the matching to choosing the next or maximum gradient maxima with a similar orientation as the projection in a gravity-constrained pose estimation increases the correct matches.

FIG. 5D depicts an example of a possible false matching. Non confident-degrees-of-freedom-constrained pose estimation: In 6 degrees of freedom pose estimation errors can happen in any of the 6 degrees of freedom. This figure shows a possible error in pose estimation in one of the degrees of freedom of rotation. Confident-degrees-of-freedom-constrained matching: If the adapted sensor-constrained matches are used on a non sensor-constrained pose estimation they might also result in wrong matches. This figure shows additionally that applying the matching based on a similar orientation in a non rotation-constrained pose estimation (like e.g. gravity-constrained pose estimation) can again result in wrong matches.

Therefore, to use the orientation of a projected part of the digital representation as criteria for choosing the correct image correspondence from different candidates, the projection pose needs to be roughly correct to result in correct choices. In general, pose errors in rotation will have a greater impact on the error of orientation of projected lines than pose errors in translation. In the above given sample of a confident gravity measurement two degrees of rotation are already reliably known. Therefore this additional check results, in general, to a higher amount of correct correspondences for the proposed approach and thus improves the pose estimation further.

To judge whether localization was successful a scoring may be introduced to the system which computes a normalized score similar to that disclosed in C. Steger. Occlusion, clutter, and illumination invariant object recognition. International Archives of Photogrammetry and Remote Sensing, volume XXXIV, 2002, representing the probability of a correct pose, and a ratio stating on the reliability of the score. To compute the score the orientation of the projected representation of the objects into the image based on the pose to evaluate is compared with the orientation found in the image at the positions of the projection in the image. To only use the orientation of the projection for the score keeps the needed representation of the objects simple. This computation can be done but is not limited to the usage of the dot product between the orientation of the projection in the image and the orientation in the image at the points of projection. To compute the similarity at each point of the projection in the image the normalized dot product can be used. This makes the similarity measure illumination invariant and keeps the representation of the objects simple. Since also no knowledge about the polarity of the projection of the representation of the objects is assumed, the absolute dot product may be used for the similarity measure. To compute the final score the normalized absolute dot products of all projected points in the image are summed up and the mean is computed over all these points. To additionally be robust against noise in the image, which can affect the computation of orientation in the image and thus might lead to false orientations in the image, or to suppress orientations of some points the score can be computed only over those points which exceed some threshold, such as, but not limited to an image gradient bigger than a defined noise threshold.

$$\text{score} = \frac{1}{n}\sum_{k=1}^{n} \frac{|\langle p_k, o_k \rangle|}{\|p_k\| * \|o_k\|}$$

Where p is the orientation of the projection and o the corresponding orientation in the image at point k and n is the number of points k which contributed to the score.

If in addition to the orientation the representation of the objects allows further information, such as but not limited to the polarity or the texture information, this information can be introduced to the scoring function.

If the score is computed only over some of all projected points in the image, we propose that this ratio can be computed in an additional value, which indicates the reliability of the score.

$$\text{ratio} = \frac{\text{nuamber of points } k \text{ which contributed to the score}}{\text{number of all projected points } k \text{ into the image}}$$

If only few points of all projected points in the image were used to compute the score, the score might be very high, but not reliably indicating a good localization, while a score computed over lots of points represents a good pose more reliable, but might be lower due to noise. Therefore to finally judge on a successful localization, we propose that the score and the ratio could be considered together.

Note that the score and/or the ratio could be included as part of the cost function used during the optimization performed in the pose estimation process described above.

Once one or multiple good localizations are found based on the proposed approach of this invention, these good localizations can be used to initialize any frame-to-frame tracking approach which depends on one or multiple good initial localizations, such as but not limited to instant tracking or edge-based tracking.

Approaches for instant tracking are but are not limited to the usage of feature descriptor approaches or the computation of relative motion between two frames. In feature descriptor approaches features are described in image space with corresponding representation in object space and the final pose of the view can directly be computed based on detected and matched features in the view and their corresponding representation in object space. For these approaches descriptive image features are needed, which can based on their feature description be robustly detected in an image and for which correspondences in their representation exist. To run these approaches in the context of this invention, these features first need to be extracted, their representation correspondences are computed and stored together with the corresponding feature descriptions as feature map (see block 16 in FIG. 8). The computation of the feature map can be aware of and use the knowledge about the different confidence degrees of the different degrees of freedom, such as but not limited to gravity aligned features. If a representation of the objects exists, which allows the computation of the corresponding 3D representation of the given image feature under known camera pose and intrinsic parameters of the camera, such as but not limited to a polygonal or CAD model, the feature based approach can be initialized and can be run based on just one localized view. For this the descriptive features are extracted in the well localized view, the corresponding 3D representations are computed based on this pose and camera intrinsics and used as initial map for further feature and map based localization. Another way to compute the feature map is based on two or multiple localized views. The image features are then extracted and matched in the views localized by the approach proposed in this invention. For the matched features their 3D representation can be computed based on triangulation. These correspondences between the features and 3D representation can be stored as initial map and be used for further feature and map based localization. This localization can as well be aware of and use the different confidence degrees of the different degrees of freedom. Once an initial map exists the map can be extended during further localization of new frames and exploration of new parts of the scene (SLAM).

In approaches where the relative motion between two frames is computed, the pose of the first frame, which can be computed with the approach proposed in this invention, is combined with the resulting relative motion between the first and the second frame to provide the final pose of the second frame. The computation of the relative motion between two frames can be done by, but is not limited to the detection of any kind of features in one of the views, which can easily be matched, detected or tracked in the other view of the scene. Based on these image to image correspondences a relative motion up to scale can be computed. The scale in turn can be computed by the correspondences between the image and the representation of the object, which is available in the localization proposed in this invention.

Correspondences of the projected representation in the image of the localized frame as needed for this proposal, such as but not limited to edges and lines, can also directly be used as features which can be matched, detected or tracked in another frame. This allows a direct localization based on the matched image correspondences in the other image and the corresponding representations of the objects. The standard edge-based tracking approaches fall into this category of tracking approaches.

According to an embodiment, for a frame-to-frame tracking also the approach of the invention can be applied: A good localization of the last frame found based on the proposed approach of this invention can be used as initial rough pose for the current frame in a frame-to-frame tracking context. Any localization system or sensor providing confident degrees of freedom of the current frame's pose, such as but not limited to the measurement of gravity orientation provided by modern hand held devices, can update the rough initial pose from the last frame and this patents approach can be applied for final localization.

In the method according to the invention, it should be noted that the GPS data can be replaced by respectively a set of GPS data samples in the neighborhood of the estimated GPS data from the sensor. The pose estimation can therefore be based on trying a set of initial pose estimates computed from a number of samples according to the GPS sensor accuracy. The samples and the order in which they are used can be chosen according to some distribution e.g. Gaussian distribution centered on the estimated sensor data. The same idea can be applied on the other sensor data such as the magnetometer data.

In the method according to the invention, it should be noted that sensor data can be replaced by visual data: e.g. the gravity measurement made by accelerometer or by the combination of accelerometer and gyroscope can be replaced by vanishing lines, and GPS data can be replaced by keyframe-based position estimation. Further, it should be noted that the localization method proposed with this invention can be combined with any other vision-based, non-vision-based or a combination of vision based and non-vision-based localization method.

While the invention has been described with reference to exemplary embodiments and applications scenarios, it will be understood by those skilled in the art that various changes may be made and equivalents may be substituted for elements thereof without departing from the scope of the claims. Therefore, it is intended that the invention not be limited to the particular embodiments disclosed, but that the invention will include all embodiments falling within the scope of the appended claims and can be applied to various application in the industrial as well as commercial field.

What is claimed is:

1. A method of determining a position and orientation of a capturing device, the method comprising:

receiving an image depicting a real object from the capturing device;

determining a coordinate system in relation to the real object;

determining a first value of a first degree of freedom of the capturing device in the coordinate system based on first pose data, wherein the first value is associated with a first confidence degree;

determining a second value of a second degree of freedom of the capturing device in the coordinate system based on second pose data, wherein the second value is associated with a second confidence degree different from the first confidence degree;

determining an initial pose of the capturing device with respect to the real object based on the first value of the first degree of freedom and the second value of the second degree of freedom;

determining an updated value of the second degree of freedom of the capturing device based on the second confidence degree, the initial pose and the image; and determining a position and an orientation of the capturing device in the coordinate system based on the first value of the first degree of freedom and the updated value of the second degree of freedom.

2. The method according to claim 1, wherein the first pose data includes first sensor data from a first sensor and the second pose data includes second sensor data from a second sensor.

3. The method according to claim 2, wherein the first confidence degree is associated with the first sensor and the second confidence degree is associated with the second sensor.

4. The method according to claim 2, wherein the first sensor includes an accelerometer, a gyroscope, a global position sensor, an inertial sensor, a magnetometer, an odometer, a mechanical sensor, a rotary encoder, a tracking sensor, a measuring arm, a laser tracker, or a combination thereof.

5. The method according to claim 1, wherein the first pose data indicates a gravity vector of the capturing device.

6. The method according to claim 5, wherein the first pose data is provided from a gravity sensor or combination of sensors indicative of the gravity vector.

7. The method according to claim 1, further comprising:
projecting a digital representation of the real object into the image based on the initial pose; and
determining the updated value of the second degree of freedom based on the digital representation of the real object.

8. The method according to claim 7, wherein determining the updated value includes:
matching a first feature of the real object depicted in the image with a second feature of the digital representation to identify a feature correspondence; and
determining the updated value based on the feature correspondence.

9. The method according to claim 1, wherein the first confidence degree is greater than the second confidence degree.

10. The method according to claim 1, further including receiving user input that comprises interaction with the capturing device, the image, a digital representation of the real object, or a projection of the digital representation of the real object into the image.

11. The method according to claim 10, wherein the interaction includes at least one of: moving the capturing device with respect to the real object or inputting a command to translate, scale or rotate the digital representation.

12. The method according to claim 10, wherein the interaction includes performing a selection, segmentation, or drawing on a view of the real object in the image.

13. The method according to claim 10, wherein the second value of the second degree of freedom is determined based further on the user input.

14. The method according to claim 10, wherein the interaction includes initiating a transformation of the projection of the digital representation into a second projection of the digital representation, wherein the second value of the second confidence degree is determined based further on the transformation.

15. The method according to claim 8, wherein the feature correspondence has approximately the same orientation as the projection of the digital representation.

16. The method according to claim 8, wherein at least one of search direction or search range for determining the feature correspondence is constrained by the first value of the first degree of freedom based on the first confidence degree.

17. The method according to claim 1, further comprising determining a score indicating a level of success of an object localization by:
projecting a digital representation of the real object into the image based on the determined position and orientation of the capturing device; and
comparing an orientation of the digital representation to an orientation of the real object in the image.

18. The method according to claim 1, further comprising initializing an image-to-image tracking process based on the determined position and orientation of the capturing device.

19. The method according to claim 18, wherein the image-to-image tracking process is configured to disregard the second degree of freedom based on the second confidence degree.

20. The method according to claim 18, wherein the image-to-image tracking process includes detecting correspondences between another image and a projected digital representation of the real object in the image.

21. A non-transitory computer readable medium comprising software code executable to perform a method of determining a position and orientation of a device, the method comprising:
receiving an image depicting a real object from a capturing device;
determining a coordinate system in relation to the real object;
determining a first value of a first degree of freedom of the capturing device in the coordinate system based on first pose data, wherein the first value is associated with a first confidence degree;
determining a second value of a second degree of freedom of the capturing device in the coordinate system based on second pose data, wherein the second value is associated with a second confidence degree different from the first confidence degree;
determining an initial pose of the capturing device with respect to the real object based on the first value of the first degree of freedom and the second value of the second degree of freedom;
determining an updated value of the second degree of freedom of the capturing device based on the second confidence degree, the initial pose and the image; and
determining a position and an orientation of the capturing device in the coordinate system based on the first value of the first degree of freedom and the updated value of the second degree of freedom.

22. The method according to claim 11, wherein the interaction includes moving, pinching, or rotation gestures detected by a touch screen or a gesture recognition system.

23. The method of claim 1, wherein the updated value of the second degree of freedom is determined in response to the second confidence degree satisfying a confidence threshold.

24. The method of claim 1, further comprising determining an intrinsic parameter of the capturing device, wherein the updated value of the second degree of freedom is determined based further on the intrinsic parameter of the capturing device.

25. An apparatus comprising:
one or more processors; and
a memory storing instructions that, when executed by the one or more processors, cause the one or more processors to perform operations including:
receiving an image depicting a real object from a capturing device;
determining a coordinate system in relation to the real object;
determining a first value of a first degree of freedom of the capturing device in the coordinate system based on first pose data, wherein the first value is associated with a first confidence degree;
determining a second value of a second degree of freedom of the capturing device in the coordinate system based on second pose data, wherein the second value is associated with a second confidence degree different from the first confidence degree;
determining an initial pose of the capturing device with respect to the real object based on the first value of the first degree of freedom and the second value of the second degree of freedom;
determining an updated value of the second degree of freedom of the capturing device based on the second confidence degree, the initial pose and the image; and
determining a position and an orientation of the capturing device in the coordinate system based on the first value of the first degree of freedom and the updated value of the second degree of freedom.

* * * * *

(12) SUPPLEMENTAL EXAMINATION CERTIFICATE

United States Patent  
Langer et al.

(10) Number: US 9,990,726 F1  
(45) Certificate Issued: Nov. 15, 2018

Control No.: 96/000,270  
Filing Date: Sep. 19, 2018  
Primary Examiner: Kenneth J. Whittington No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| 7,826,641 | 11/2010 | Mandella et al. |